(12) United States Patent
Thurner

(10) Patent No.: US 7,657,404 B2
(45) Date of Patent: Feb. 2, 2010

(54) ENGINEERING METHOD AND SYSTEM FOR INDUSTRIAL AUTOMATION SYSTEMS

(75) Inventor: Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 10/504,937

(22) PCT Filed: Feb. 7, 2003

(86) PCT No.: PCT/DE03/00358

§ 371 (c)(1), (2), (4) Date: Aug. 13, 2004

(87) PCT Pub. No.: WO03/071455

PCT Pub. Date: Aug. 28, 2003

(65) Prior Publication Data

US 2005/0159932 A1    Jul. 21, 2005

(30) Foreign Application Priority Data

Feb. 19, 2002 (DE) .............................. 102 06 902

(51) Int. Cl.
*G06F 17/50* (2006.01)
*G06G 7/48* (2006.01)
*G06F 19/00* (2006.01)

(52) U.S. Cl. .................. 703/1; 703/7; 700/97
(58) Field of Classification Search .................. 703/1, 703/7; 700/95, 97, 112, 117
See application file for complete search history.

(56) References Cited

U.S. PATENT DOCUMENTS

| | | | | |
|---|---|---|---|---|
| 5,204,960 A | * | 4/1993 | Smith et al. | 717/145 |
| 5,367,624 A | * | 11/1994 | Cooper | 715/734 |
| 5,463,555 A | * | 10/1995 | Ward et al. | 700/96 |
| 6,128,588 A | | 10/2000 | Chacon | |
| 6,141,647 A | * | 10/2000 | Meijer et al. | 705/1 |
| 6,665,687 B1 | * | 12/2003 | Burke | 707/104.1 |
| 2003/0172371 A1 | * | 9/2003 | Offenmuller | 717/120 |

FOREIGN PATENT DOCUMENTS

| | | |
|---|---|---|
| DE | 199 55 718 A1 | 5/2000 |
| DE | 199 10 535 A1 | 9/2000 |
| DE | 199 59 245 A1 | 6/2001 |
| DE | 101 12 843 A1 | 9/2001 |
| WO | WO 00/54188 | 9/2000 |
| WO | WO 00/63751 | 10/2000 |

OTHER PUBLICATIONS

Dirk Kozian, "Transparenz über die Abläufe schaffen", Elektrotechnik fur die Automatisierung 11, Nov. 17, 1999, pp. 66, 68-69.

Hemang Lavana, Amit Khetawat, Franc Brglez and Krzysztof Kozminski, "Executable Workflows: A Paradigm for Collaborative Design on the Internet", Proceedings of the Design Automation Conference, Anaheim, Jun. 9-13, 1997, New York, ACM, USA, vol. Conf. 34. Jun. 9, 1997, pp. 553-558, XP010227500.

David Chapell, "ActiveX und OLE verstehen (Ausschnitt S.62-65, 232-234)", 1996, Microsoft Press, Unterschleissheim, pp. 62-65, 232-234.

\* cited by examiner

*Primary Examiner*—Paul L Rodriguez
*Assistant Examiner*—Nithya Janakiraman

(57) ABSTRACT

The invention relates to an engineering method and system for industrial automation systems, in particular for MES systems, based on at least one computational unit with an input auxiliary device, an output auxiliary device, in addition to at least one display device. According to said method, the modelled objects comprise installation structures or installation parts and are linked to meta information. The modelled objects are structured in the engineering method as hierarchical trees and can be interconnected by lateral networking or by means of a cursor. The objects are executed in run-time by evaluating the meta information in a target system, whereby the functions of an installation that has been modelled in the engineering method are determined from the structure of the tree and the networked connections.

7 Claims, 5 Drawing Sheets

ENGINEERING METHOD AND SYSTEM FOR INDUSTRIAL AUTOMATION SYSTEMS

CROSS REFERENCE TO RELATED APPLICATIONS

This application is the US National Stage of International Application No. PCT/DE03/00358, filed Feb. 7, 2003 and claims the benefit thereof. The International Application claims the benefits of German application No. 10206902.6 filed Feb. 19, 2002, both of the applications are incorporated by reference herein in their entirety.

FIELD OF INVENTION

The invention relates to an engineering method and an engineering system for industrial automation systems, in particular for MES systems, based on at least one computational unit with an input auxiliary device, an output auxiliary device, and also at least one display device.

In addition, the invention relates to a computer program, a data medium and a data processing facility.

BACKGROUND OF INVENTION

The use of so-called manufacturing execution systems (MES) for the automation of production or manufacturing processes is known from "Software für die Automatisierung—Transparenz über die Abläufe schaffen" (Software for automation—creating transparency for the processes), article by Dirk Kozian in Elektronik für die Automatisierung 11 (Electronics for automation), 17 Nov. 1999. These systems integrate the automation level (controls) with the ERP systems (ERP: Enterprise Resource Planning) of the company management level. Manufacturing execution systems are systems which for example provide information for the optimization of production processes, and/or perform the coordination or optimization of the production processes. On the one hand, the manufacturing execution systems must supplement the rough planning data used in the ERP systems with installation-specific and current fine planning data and pass this on to the subordinate automation level, on the other hand they have the task of taking over production-related information from the automation level, editing it and reporting it to the company management level. One of the functions implemented by MES systems is thus vertical integration between the company management level and the automation level. Typical individual tasks performed by MES systems are enterprise asset management, maintenance management, information management, scheduling, dispatching, and trace and tracking. These tasks are carried out in each case by MES components or MES applications.

In the classic programming languages (such as Pascal or Fortran) which were used in the eighties for writing software, data and functions were separate. Only in the course of the paradigm of object orientation were data and functions combined to form objects. During the nineties, meta data was assigned to the objects in individual cases as an initial stage. Meta data is information about other information, for example information about available objects themselves. Although this meta data is available in the overall system or in the overall context, it is however neither stored physically in an object, nor does it contain knowledge about the application to be implemented for an industrial installation or about the business process to be implemented.

Programmable automation systems or MES systems, in other words systems for controlling and/or regulating automated processes or installations, as a rule contain a so-called runtime system for providing time-based sequence control of an automation component, a machine or a system, and also a so-called engineering system for creating and editing control programs and installation functions which are intended for execution in the runtime system. Normally, many information items characterizing the automation or MES system (for example: constituents of the automation system, technological contexts, business process specifications etc.) are available only on the engineering system or on external data storage facilities and/or as employee know-how.

SUMMARY OF INVENTION

The object of the invention is to prepare and configure the objects created during the engineering phase (installation parts, installation components, automation components etc.) in such a way that these objects can be used advantageously in later phases (for example: commissioning, operation, maintenance, modification or repair of an installation or an automation system).

According to the invention the aforementioned object is achieved by the claims. The meta information associated with an object describes, for example, which data and functions an object contains, but meta information can also contain descriptions relating to implementation and operation or include user documentation, or information about the overall process, the business process or the production process. In markup languages such as HTML or XML, meta information can be described by way of so-called tags or by way of attributes and be assigned to the objects. Meta information can also be provided with a hierarchical structure. One advantage of the invention consists in the fact that no explicit code generation is required in order to allow an installation specification created in the engineering phase to run. The processing logic and the process sequence of the installation represented by the tree are defined from the structure of the tree and its networked connections. The structure of the tree, which can be modified manually or automatically at runtime, and the networked connections of the tree elements determine which operands are supplied to functions and whether functions are executed sequentially or in parallel. With regard to industrial installations, the structure of the tree and the networked connections of the tree elements serve to determine, for example, which input variables are supplied to devices and how the output values generated by the device are further processed. The tree and the networked connections are edited graphically by a user on an engineering system. The form of representation for the trees can be different and can be freely chosen by the user. The networked connections or cross-referencing by means of pointers of the tree elements can be effected by the hierarchical arrangement in the tree. However, networked connections or cross-referencing by means of pointers of the tree elements can also be made by means of references edited by the user or lateral networked connections to elements in other sub-trees. The inputs for creating the tree and for establishing networked connections can be made by way of input masks, drag & drop mechanisms or by using voice input.

The implementation of the objects, in other words their code and meta information, is associated with the individual objects. As a result of the fact that the application created in the engineering phase is composed at runtime of prefabricated objects (for example, automatically on the basis of their meta information), it is possible to dispense with an explicit compilation phase for generating the code of the application to be produced by the engineering phase. Compilation or generation runs can last an extremely long time. As a result of the fact that explicit compilation runs or generation runs are not required because the runtime system is always directly modified incrementally, the time needed to create the installation specification, perform testing and commissioning is kept to a minimum.

A further important advantage consists in the fact that programs and data are handled in a uniform manner. Data are object trees without functions, programs are object trees with functions. All the mechanisms present in a runtime system for combining, interconnecting, versioning, saving, transporting etc. data and programs only need to be implemented once and not separately for data and for programs. This also facilitates handling for software developers, commissioning engineers and administrators since they only need to familiarize themselves once with these mechanisms.

A further advantage consists in the fact that changes can be made very easily. Sub-trees can be added, modified or removed at any time without the need to modify the entire tree structure. This increases the agility of a company because it can react more quickly to changed market needs. This is important particularly when the applications created during the engineering phase are used for controlling automation systems, production installations or MES systems.

The networking, cross-referencing by means of pointers or referencing between the objects can happen at differing levels of granularity. A networked connection can thus be effected for example by reference to physical addresses (by using cursors or pointers), as a result of which a high level of efficiency (for example within the execution of a process) is achieved. Other networking mechanisms are for example electronic messages (email for example), telephone or fax. An appropriate networking mechanism can be chosen by the user depending on the requirements of the underlying application.

Existing installations or automation systems are characterized by a high level of complexity. The complexity, which is responsible for the rise in the durability costs, lies both in the individual installation (devices for example) and/or automation components (actuators and sensors for example) and also in the interaction of the components in providing an overall solution. If the know-how concerning the interaction of the components is linked by meta information to the components or objects, it is possible thereby to gain a significant competitive advantage since the durability costs of the automation and installation components can be reduced as a result. The presence of meta information at and/or in the objects offers automatic support for personnel up to and including automatic implementation of the following functions: commissioning, operation, maintenance, modification or repair.

A first advantageous embodiment of the present invention for an engineering method consists in the fact that the objects are runtime objects. Runtime objects are objects which execute the logic of the system at system runtime. Examples of such runtime objects are installations and installation parts, control units, orders, batches, function modules, tags, archives, alarms, images, indicators etc. As a result, the consistency between engineering information and runtime system is ensured. Modifications can be performed more easily and with less susceptibility to errors as a result.

A further advantageous embodiment of the present invention for an engineering method consists in the fact that the objects are automatically combined at runtime to form an automation system for an automation solution. The combination is carried out using the meta data associated with the runtime objects. As a result, the engineering of an installation can be carried out independently of the underlying target system. Depending on the meta information that is coupled with the objects (objects can have different levels of granularity, from complex installation parts right down to small installation components), the objects are combined automatically at runtime to form an executable overall installation. Changes can thus also be easily incorporated during very late phases.

A further advantageous embodiment of the present invention for an engineering method consists in the fact that the objects and/or networking mechanisms and/or implementations of the objects or of the networking mechanisms can be exchanged at runtime. As a result of the fact that objects can be replaced by other objects at runtime, for example by objects with extended functionality or the implementations of objects (for example the new implementations are debugged or have a better performance) or referencing and networking mechanisms can be exchanged, the turnaround time with regard to modifications is significantly reduced. As a result, the flexibility for the user and the operator of an installation is increased and the agility of a company is increased. No ordinary compiler is used for evaluation of the meta information, but a so-called incremental compiler or an interpreter which is active locally to the object only at the time of the exchange. If necessary, code is generated incrementally for the newly used object and the incremental compiler interpreter inserts the newly used object (or the referencing mechanism and/or networking and/or networking mechanism and/or a new implementation of objects) into the tree again at runtime, without having to take other (unaffected) parts of the tree into consideration.

A further advantageous embodiment of the present invention for an engineering method consists in the fact that the function of the automation system is derived automatically from the description of the objects, the structure of the hierarchical trees and the networking of the objects in the trees. As a result, no explicit code generation is required in order to allow an installation or installation function modeled in the engineering phase to execute. The processing logic and the process sequence of the installation represented by the tree are defined from the structure of the tree and its networked connections. The structure of the tree and the networked connections of the tree elements determine which operands are supplied to functions and whether functions are executed sequentially or in parallel. With regard to industrial installations, the structure of the tree and the networked connections of the tree elements serve to determine, for example, which input variables are supplied to devices and how the output values generated by the device are further processed. The tree and the networked connections are edited graphically by a user on an engineering environment.

A further advantageous embodiment of the present invention for an engineering method consists in the fact that the objects are networked statically and/or dynamically. Networking (or cross-referencing by means of pointers or referencing) can take place statically in the event of manual creation of the tree, but can also happen automatically on the basis of current information (installation states, for example) or meta information. The result is enhanced flexibility for the user. Networked connections can be set up by way of different mechanisms and implementations: for example pointers to objects, email to objects or networking by way of OPC protocols (OPC: OLE for Process Control). OPC protocols are used frequently particularly in the industrial arena. Further techniques or implementations which can be used for networked connections or for links are for example MSMQ (Microsoft Message Queue), HTTP (Hypertext Transfer Protocol) or SOAP (Simple Object Transfer Protocol).

A further advantageous embodiment of the present invention for an engineering method consists in the fact that the objects physically contain the meta information. As a result, the principle of locality is supported during the creation of the installation or the installation specification, in other words all the information (including the meta information) which is important for an object is also present physically in the object. The access to this information is facilitated as a result. As a result of the fact that the objects (installation parts or installation components for example) contain the meta information physically, it is also possible to use an object on its own for the purposes of organization, reorganization or reconfiguration of the installation, depending on which meta information (type and scope) is present in the object. This is advantageous particularly for mobile objects, for software agents for example, which move from computer to computer on the internet in order for example to offer high-performance collection local to the computer in each case of installation information (for a maintenance system for example).

A further advantageous embodiment of the present invention for an engineering method consists in the fact that the objects which physically contain the meta information are runtime objects. Runtime objects execute the logic of the system at system runtime. If runtime objects contain meta information which is relevant to the engineering phase, or is created in the engineering phase, the consistency of the data and of the objects is guaranteed. In other words, consistency is ensured between creation of the objects and execution of the objects.

A further advantageous embodiment of the present invention for an engineering method consists in the fact that the meta information describes an application or a business process. If the meta information contains not only information about the object itself but also information about the entire installation, about the deployment environment or about the business process to be implemented, then the configuration of the installation is simplified as a result, to the extent that a configuration can take place automatically. Reconfigurations (for example after installation crashes or failure of parts of the system) can also take place automatically without human intervention. The agility of a company is increased as a result.

A further advantageous embodiment of the present invention for an engineering method consists in the fact that each individual object contains the entire meta information about the application or the business process. This means that the entire description of an installation or also of a business process is contained in each individual installation object in the installation (for example in an object "valve" or in an object "mixer", but also in the very smallest tag, in every variable or in every operator, in other words also in the very fine granular objects). By means of this information, each individual object can be used for a reorganization, but also for self-organization of the installation or of the business process. This is extremely advantageous for example in the case of system faults when large parts of the system fail. The system can regenerate itself completely from the smallest still functional part. A maintenance engineer does not therefore need to concern himself with the troublesome tasks of obtaining and reading documentation.

A further advantageous embodiment of the present invention for an engineering method consists in the fact that the automation system reconfigures itself in the event of an error. In the event of a error, the automation system reconfigures or repairs itself by using meta information, copies, replicas or clones of the disrupted or destroyed objects themselves. When the entire description of an installation or also of a business process is contained in each individual installation object in the installation (for example in an object "valve" or in an object "mixer", but also in the very smallest tag, in every variable or in every operator, in other words also in the very fine granular objects), this information can be used for the purposes of an automatic reorganization, in other words a self-healing of the application, the system or the business process. User intervention is no longer required and downtimes are minimized. A maintenance engineer does not therefore need to concern himself with the troublesome tasks of obtaining and reading documentation.

A further advantageous embodiment of the present invention for an engineering method consists in the fact that the trees can be represented in different views on the display device. The representation of the trees can be varied, for example using a static Explorer-like notation or in the form of workflow or sequence charts (flowcharts, activity diagrams) or for example in the form of block diagrams (circuit diagrams for example) or installation plans. As a result, the flexibility is greatly increased for the user because he can select a form of notation or visualization appropriate to his state of knowledge. It is also possible to switch between forms of representation.

A further advantageous embodiment of the present invention for an engineering method consists in the fact that the objects can be networked with a display device by means of a drag & drop mechanism. Networked connections between objects can also be made by means of input masks or editing operations. However, when links are made by using a mouse (or light pen) on the display device by way of a drag & drop mechanism, the efficiency of a user in the engineering process is increased. This results in cost benefits.

The meta information associated with an object describes, for example, which data and functions an object contains, but meta information can also contain descriptions relating to implementation and operation or include user documentation, or information about the overall process, the business process or the production process. In markup languages such as HTML or XML, meta information can be described by way of so-called tags or by way of attributes and be assigned to the objects. Meta information can also be provided with a hierarchical structure. One advantage of the invention consists in the fact that no explicit code generation is required in order to allow an installation specification created in the engineering phase to run. The processing logic and the process sequence of the installation represented by the tree are defined from the structure of the tree and its networked connections. The structure of the tree, which can be modified manually or automatically at runtime, and the networked connections of the tree elements determine which operands are supplied to functions and whether functions are executed sequentially or in parallel. With regard to industrial installations, the structure of the tree and the networked connections of the tree elements serve to determine, for example, which input variables are supplied to devices and how the output values generated by the device are further processed. The tree and the networked connections are edited graphically by a user on an engineering system. The form of representation for the trees can different and can be freely chosen by the user. The networked connections or cross-referencing by means of pointers of the tree elements can be effected by the hierarchical arrangement in the tree. However, networked connections or cross-referencing by means of pointers of the tree elements can also be made by means of references edited by the user or lateral networked connections to elements in other sub-trees. The inputs for creating the tree and for establishing networked connections can be made by way of input masks, drag & drop mechanisms or by using voice input.

The implementation of the objects, in other words their code and meta information, is associated with the individual objects. As a result of the fact that the application created in the engineering phase is composed at runtime of prefabricated objects (for example, automatically on the basis of their meta information), it is possible to dispense with an explicit compilation phase for generating the code of the application to be produced by the engineering phase. Compilation or generation runs can last an extremely long time. As a result of the fact that explicit compilation runs or generation runs are not required because the runtime system is always directly modified incrementally, the time needed to create the installation specification, perform testing and commissioning is kept to a minimum.

A further important advantage consists in the fact that programs and data are handled in a uniform manner. Data are object trees without functions, programs are object trees with functions. All the mechanisms present in a runtime system for combining, networking, versioning, saving, transporting etc. data and programs only need to be implemented once and not separately for data and for programs. This also facilitates handling for software developers, commissioning engineers and administrators since they only need to familiarize themselves once with these mechanisms.

A further advantage consists in the fact that changes can be made very easily. Sub-trees can be added, modified or removed at any time without the need to modify the entire tree structure. This increases the agility of a company because it can react more quickly to changed market needs. This is important particularly when the applications created during the engineering phase are used for controlling automation systems, production installations or MES systems.

The networking, cross-referencing by means of pointers or referencing between the objects can happen at differing levels of granularity. A networked connection can thus be effected for example by reference to physical addresses (by using cursors or pointers), as a result of which a high level of efficiency (for example within the execution of a process) is achieved. Other networking mechanisms are for example electronic messages (email for example), telephone or fax. An appropriate networking mechanism can be chosen by the user depending on the requirements of the underlying application.

Existing installations or automation systems are characterized by a high level of complexity. The complexity, which is responsible for the rise in the durability costs, lies both in the individual installation (devices for example) and/or automation components (actuators and sensors for example) and also in the interaction of the components in providing an overall solution. If the know-how concerning the interaction of the components is linked by meta information to the components or objects, it is possible thereby to gain a significant competitive advantage since the durability costs of the automation and installation components can be reduced as a result. The presence of meta information at and/or in the objects offers automatic support for personnel up to and including automatic implementation of the following functions: commissioning, operation, maintenance, modification or repair.

A first advantageous embodiment of the present invention for an engineering system consists in the fact that the objects are runtime objects. Runtime objects are objects which execute the logic of the system at system runtime. Examples of such runtime objects are installations and installation parts, control units, orders, batches, function modules, tags, archives, alarms, images, indicators etc. As a result, the consistency between engineering information and runtime system is ensured. Modifications can be performed more easily and with less susceptibility to errors as a result.

A further advantageous embodiment of the present invention for an engineering system consists in the fact that the objects can be automatically combined at runtime to form an automation system for an automation solution. The combination is carried out using the meta data associated with the runtime objects. As a result, the engineering of an installation can be carried out independently of the underlying target system. Depending on the meta information that is coupled with the objects (objects can have different levels of granularity, from complex installation parts right down to small installation components), the objects are combined automatically at runtime to form an executable overall installation. Changes can thus also be easily incorporated during very late phases.

A further advantageous embodiment of the present invention for an engineering system consists in the fact that at runtime the objects and/or networking mechanisms and/or implementations of the objects or of the networking mechanisms are interchangeable. As a result of the fact that at runtime objects can be replaced by other objects, for example by objects with extended functionality or the implementations of objects (for example the new implementations are debugged or have a better performance) or referencing and networking mechanisms can be exchanged, the turnaround time with regard to modifications is significantly reduced. As a result, the flexibility for the user and the operator of an installation is increased and the agility of a company is increased. No ordinary compiler is used for evaluation of the meta information, but a so-called incremental compiler or an interpreter which is active locally to the object only at the time of the exchange. If necessary, code is generated incrementally for the newly used object and the incremental compiler interpreter inserts the newly used object (or the referencing mechanism and/or networking and/or networking mechanism and/or a new implementation of objects) into the tree again at runtime, without having to take other (unaffected) parts of the tree into consideration.

A further advantageous embodiment of the present invention for an engineering system consists in the fact that the function of the automation system can be derived automatically from the structure of the hierarchical trees. As a result, no explicit code generation is required in order to allow an installation or installation function modeled in the engineering phase to execute. The processing logic and the process sequence of the installation represented by the tree are defined from the structure of the tree and its networked connections. The structure of the tree and the networked connections of the tree elements determine which operands are supplied to functions and whether functions are executed sequentially or in parallel. With regard to industrial installations, the structure of the tree and the networked connections of the tree elements serve to determine, for example, which input variables are supplied to devices and how the output values generated by the device are further processed. The tree and the networked connections are edited graphically by a user on an engineering environment.

A further advantageous embodiment of the present invention for an engineering system consists in the fact that the objects can be networked statically and/or dynamically. Networking (or cross-referencing by means of pointers or referencing) can take place statically in the event of manual creation of the tree, but can also happen automatically on the basis of current information (installation states, for example) or meta information. The result is enhanced flexibility for the user. Networked connections can be set up by way of different mechanisms and implementations: for example pointers to objects, email to objects or networking by way of OPC protocols (OPC: OLE for Process Control). OPC protocols are used frequently particularly in the industrial arena. Further techniques or implementations which can be used for networked connections or for links are for example MSMQ (Microsoft Message Queue), HTTP (Hypertext Transfer Protocol) or SOAP (Simple Object Transfer Protocol).

A further advantageous embodiment of the present invention for an engineering system consists in the fact that the objects contain the meta information physically. As a result, the principle of locality is supported during the modeling of installations, in other words all the information (including the meta information) which is important for an object is also present physically in the object (installation parts are represented by objects in the engineering phase). The access to this information is facilitated as a result. As a result of the fact that the objects contain the meta information physically, it is also possible to use an object on its own for the purposes of organization, reorganization or reconfiguration of an installation or an installation configuration, depending on which meta information (type and scope) is present in the object. This is advantageous particularly for mobile objects, for software agents for example, which move from computer to computer on the internet in order for example to offer high-performance collection local to the computer in each case of installation information (for a maintenance system for example).

A further advantageous embodiment of the present invention for an engineering system consists in the fact that the objects which physically contain the meta information are runtime objects. Runtime objects execute the logic of the system at system runtime. If runtime objects contain meta information which is relevant to the engineering phase, or is created in the engineering phase, the consistency of the data and of the objects is guaranteed. In other words, consistency is ensured between creation of the objects and execution of the objects.

A further advantageous embodiment of the present invention for an engineering system consists in the fact that the meta information describes an application or a business process. If the meta information contains not only information about the object itself but also information about the entire installation, about the deployment environment or about the business process to be implemented, then the configuration of the installation is simplified as a result, to the extent that a configuration can take place automatically. Reconfigurations (for example after system crashes or failure of parts of the system) can also take place automatically without human intervention. The agility of a company is increased as a result.

A further advantageous embodiment of the present invention for an engineering system consists in the fact that each individual object contains the entire meta information about the application or the business process. This means that the entire description of an installation or also of a business process is contained in each individual installation object in the installation (for example in an object "valve" or in an object "mixer", but also in the very smallest tag, in every variable or in every operator, in other words also in the very fine granular objects). By means of this information, each individual object can be used for a reorganization, but also for self-organization of the installation or of the business process. This is extremely advantageous for example in the case of system faults when large parts of the system fail. The system can regenerate itself completely from the smallest still functional part. A maintenance engineer does not therefore need to concern himself with the troublesome tasks of obtaining and reading documentation.

A further advantageous embodiment of the present invention for an engineering system consists in the fact that the automation system can reconfigure itself in the event of a fault. In the event of a fault, the automation system reconfigures or repairs itself by using meta information, copies, replicas or clones of the disrupted or destroyed objects themselves. When the entire description of an installation or also of a business process is contained in each individual installation object in the installation (for example in an object "valve" or in an object "mixer", but also in the very smallest tag, in every variable or in every operator, in other words also in the very fine granular objects), this information can be used for the purposes of an automatic reorganization, in other words a self-healing of the application, the system or the business process. User intervention is no longer required and downtimes are minimized. A maintenance engineer does not therefore need to concern himself with the troublesome tasks of obtaining and reading documentation.

A further advantageous embodiment of the present invention for an engineering system consists in the fact that the trees can be represented in different views on the display device. The representation of the trees can be varied, for example using a static Explorer-like notation or in the form of workflow or sequence charts (flowcharts, activity diagrams) or for example in the form of block diagrams (circuit diagrams for example) or installation plans. As a result, the flexibility is greatly increased for the user because he can select a form of notation or visualization appropriate to his state of knowledge. It is also possible to switch between forms of representation.

A further advantageous embodiment of the present invention for an engineering system consists in the fact that the objects can be provided with networked connections by means of a drag & drop mechanism. Networked connections between objects can also be made by means of input masks or editing operations. However, when links are made by using a mouse (or light pen) on the display device by way of a drag & drop mechanism, the efficiency of a user in the engineering process is increased. This results in cost benefits.

A further advantageous embodiment of the present invention for an engineering system consists in the fact that the engineering system is integrated into the runtime system, whereby selectable functionalities are accessed by way of views. The traditional engineering system is thus reduced to representations and editors which allow the runtime system to be directly observed and modified. The advantages of this design principle and this architecture are a simpler capability to modify the runtime system coupled with system and data consistency.

A further advantageous embodiment of the present invention consists in the fact that the system according to the invention or the method according to the invention are implemented by means of a computer program. As a result, any necessary modifications or adjustments can be easily made.

A further advantageous embodiment of the present invention consists in the fact that the computer program for the method according to the invention is stored on a data medium. As a result, the method is easily manageable in respect of logistics and distribution. The data media used are normal computer program products such as floppy disks or CDs for example.

A further advantageous embodiment of the present invention consists in the fact that the computer program for the method according to the invention is installed on a data processing facility. The performance is increased as a result.

Further advantages and details of the invention are set down in the description which follows of advantageous embodiments and with reference to the drawings. Insofar as elements having the same functionality are described in different figures, these elements are identified by the same reference characters.

In the drawings:

DETAILED DESCRIPTION OF INVENTION

Figure 1:
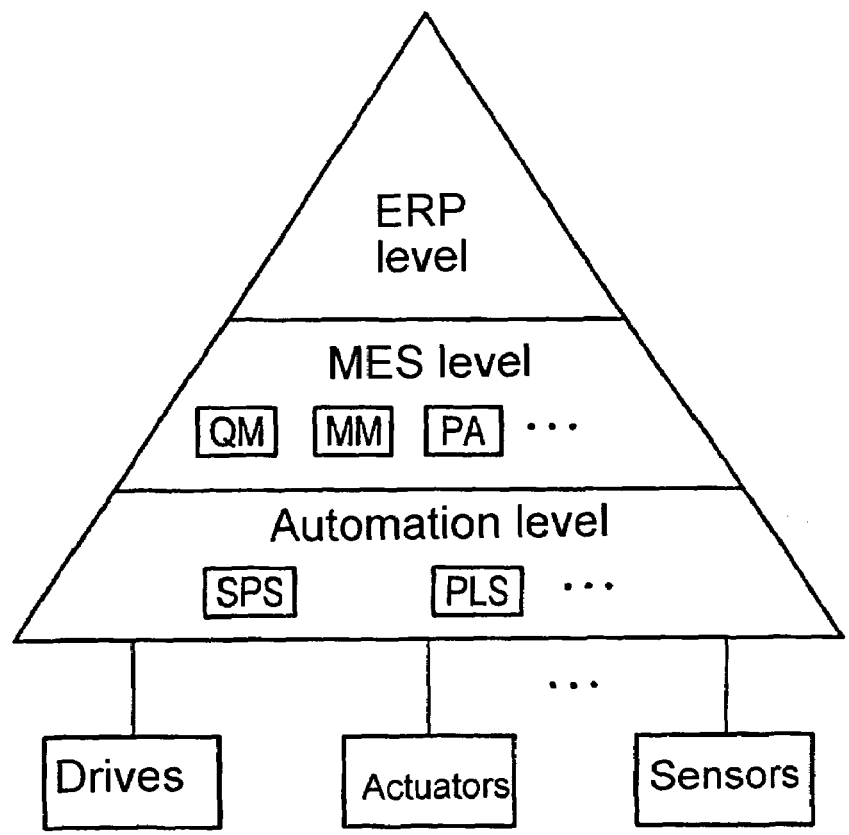
FIG. 1 shows a basic block diagram of the "company pyramid" containing three levels of control.

The representation shown in FIG. 1 illustrates in a basic block diagram the three control levels as they are normally to be found in a production and/or manufacturing company. The pyramidal form is indicative of the fact that a compression of information takes place towards the top. The uppermost level is the ERP level (Enterprise Resource Planning). The business administration and sales/marketing functions are normally performed on this company management level in a company (for example financial system, sales and marketing, personnel, reporting). However, logistical tasks which span more than one production installation (order and materials management, for example) are also performed on this level. The SAP R/3 system is an ERP system which is used very frequently on the company management level.

The lowermost level of the pyramid is the automation level (controls). Programmable controllers (SPS) in conjunction with visualization and process control systems (PLS) are normally used on this level. The drives, actuators and sensors used in the production and/or manufacturing facilities are in direct contact with the systems of this level.

The linking element between the ERP level and the automation level is formed by the MES level. The applications of the MES level thus provide for a vertical integration between the ERP level and the automation level. The MES applications must on the one hand supplement the draft plans of the ERP systems with detailed plans specific to production installations and pass these on to the systems of the automation level, while on the other hand it is the task of the MES applications to pick up production-related data from the automation level, prepare this data and pass it on to the ERP level (company management level) and also to optimize the processes in the production environment.

Typical MES applications include quality management (QM), maintenance management (MM), performance analysis (PA), process management, labor management, asset management. The ellipses used in FIG. 1 indicate that there may be further elements (applications, systems etc.) in each case on the level in question.

MES systems and ERP systems as a rule contain a so-called runtime system for providing time-based sequence control of the components involved (sub-components, modules, tasks, operating system processes etc.), and also a so-called engineering system for creating and editing programs which are intended for execution in the runtime system.

Figure 2:
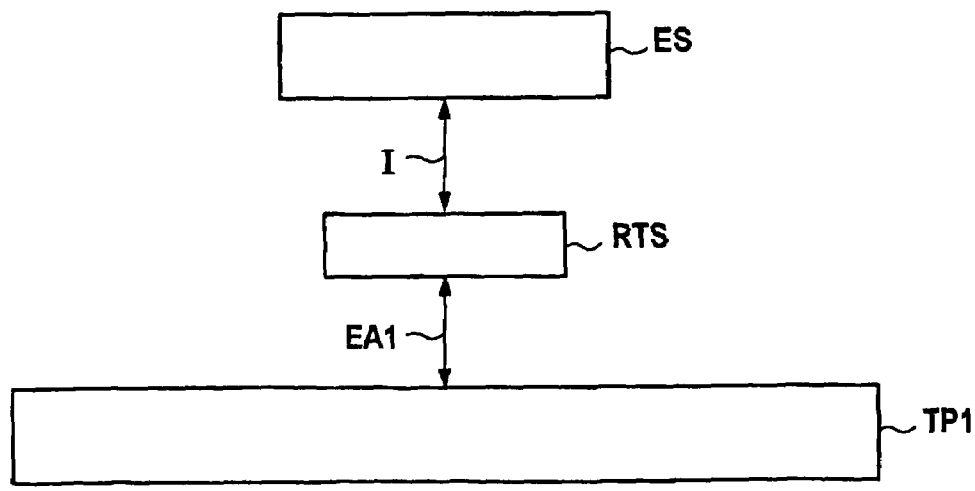
FIG. 2 shows a schematic representation comprising an engineering system, a runtime system and a technical process to be controlled.

The illustration in FIG. 2 shows a schematic representation comprising an engineering system (ES), a runtime system (RTS) and a technical process (TP1) to be controlled. The connection between the runtime system RTS of the control facility (or of the automation system or the MES system) and the technical process TP1 is effected bidirectionally by way of the inputs/outputs EA1. The programming of the control facility and thus the specification of the behavior of the runtime system RTS is carried out in the engineering system. The engineering system ES contains tools for the configuration, planning and programming for machines and for the control of technical processes, such as industrial installations for example. The programs created in the engineering system are transferred by way of the information path I into the runtime system RTS of the target system. With regard to its hardware equipment, an engineering system ES normally consists of a computer system with a graphics screen (a display for example), input auxiliary devices (keyboard and mouse, for example), processor, main memory and secondary storage, a facility for recording on computer-readable media (floppy disks, CDs, for example) and also connection units for the exchange of data with other systems (further computer systems, control facilities for technical processes, for example) or media (internet, for example). Today, engineering systems ES have editors and graphical tools for the object-oriented modeling of installations or control facilities. A typical modeling method which is supported by these tools is for example UML (Unified Modeling Language) with a number of different diagram types that make it possible to engineer an installation from different viewpoints. As a result, the advantages which are known from visual programming are yielded in the engineering phase: increased productivity for originator and end user, as well as ease of updating, and easy error recovery. Diagnostics and the simulation of control facilities or installations are also supported.

In addition, modern engineering systems ES also enable access to configuration management tools and to modification management tools.

Today, modern engineering systems ES in particular support the paradigms of object orientation such as the creation of objects, the creation of classes, the creation of upper classes as well as the representation of inheritance relationships. By way of suitable editors, mask input or drag & drop mechanisms the objects are linked to meta information, the objects are structured as hierarchical trees and also networked with one another. The control facilities or installation specifications created with the aid of the engineering system ES must ultimately be executed on a target system or on a target computer in order for example to control a technical process TP1. The target system normally comprises one or a plurality of computational units with processors and storage facilities and also a runtime system RTS. The control programs or installation specifications created with the aid of the engineering system ES are loaded onto the runtime system RTS by way of the information path I. The underlying technical process TP1, for an automation solution or an MES solution for example, is controlled by way of input/output connections EA1. Actuators, for example, are influenced by the runtime system RTS by way of the input/output connection EA1 to the technical process TP1, and sensor data, for example, is delivered by the technical process TP1 back to the runtime system RTS by way of the input/output connection EA1, which data is then further processed in the application. A runtime system RTS can also be distributed over a plurality of computational units.

If the objects used for an installation description or the objects used for a manufacturing or assembly solution (installation parts, installation components, machines, valves etc.) are linked in the engineering phase with meta information (for example by way of references) or physically contain meta information (for example in a separate memory), then considerable advantages can be gained from this in respect of operation, maintenance, modification or repair. Meta information can for example be information about objects themselves, for example: Who is using an object?, With which other objects does it interact?. However, meta information can also comprise knowledge about an application, the business process to be implemented or the entire installation. This type of knowledge is present in the engineering phase (in functional specifications, design specifications or other installation documentation) and simply needs to be incorporated into the objects as meta information. In particular, the markup language XML (Extended Markup Language) is suitable for describing meta information and linking it with objects.

The engineering system according to the invention and/or the engineering method according to the invention are suitable for all types of engineering: chemical engineering, product engineering, installation engineering, industrial engineering, and also for software engineering. It makes sense if functions involved in process planning, project management, quality management and also production control are linked to the engineering phase. A powerful engineering system ES must support and integrate these functions by means of appropriate tool support. The throughput time is reduced in particular through the possibilities of re-use of installation objects in the engineering phase that have already been created or modeled.

Figure 3:
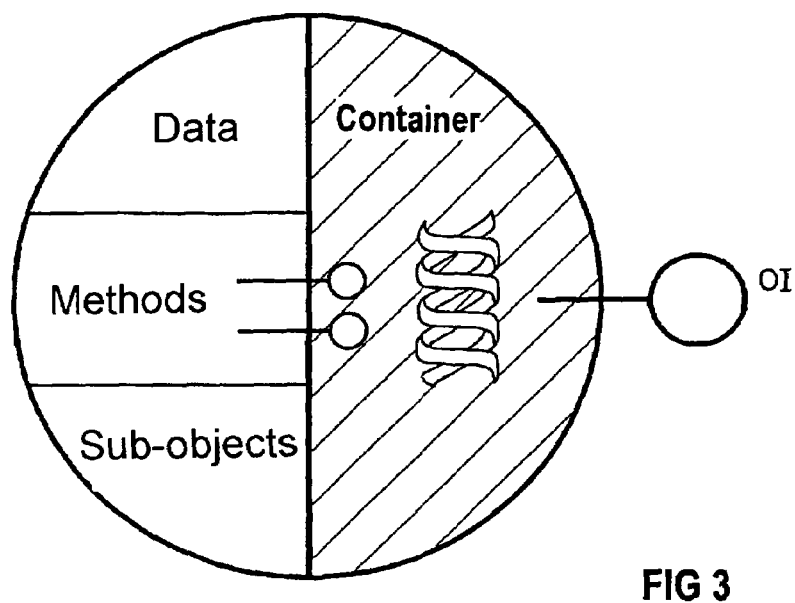
FIG. 3 shows the schematic representation of an object.

The illustration in FIG. 3 shows the schematic representation of an object with an object interface OI. Such objects can be used in all types of engineering (chemical engineering, product engineering, installation engineering, industrial engineering, software engineering). An object is generally an item or an element of a domain or a discourse world. In object-oriented software development, an object is an individual exemplar of things or articles (for example robot, car, machine), persons (for example customer, employee, patent attorney) or concepts from the real world (for example ordering task) or the imaginary world (for example legal and natural persons or organizations). An object has a certain defined state and reacts with a defined behavior to its environment. In addition, each object has an object identity which distinguishes it from all other objects and which allows it to access a particular object. One object can know one or more other objects. Connections or cross-referencing by pointers or networked connections exist between objects which know one another. The state of an object is determined by its data or attribute values and the respective connections with other objects. The behavior of an object is defined by its quantity of methods or operations. In object orientation, the type of an object is described by a class. Concrete incarnations or instances which then represent a concrete programming language object can be generated from this type description. Objects and their connections can be represented graphically with the aid of object diagrams. The editors for object diagrams are part of the engineering system (ES; FIG. 2). UML (Unified Modeling Language) offers a series of notations for the graphical representation of object-oriented concepts (business process diagram, state diagram, activity diagram, collaboration diagram, sequence diagram, class diagrams, etc.). These diagrams can be edited and processed by a user in an engineering system (ES; FIG. 2).

The left-hand part of FIG. 3 shows the information or elements which an object normally contains. Data thus comprises simple things such as a numerical value or also complex structures such as formulas, orders or archives. Methods (often also referred to as operations) represent executable activities in accordance with an algorithm. The set of methods determines the behavior of an object class or of an object instantiated by this class. The methods of an object can be used or called by other objects, comparable with a client-server architecture. In addition, objects can contain so-called sub-objects which they require in order to implement their methods. A structural configuration of an object is determined by the sub-objects.

A so-called container is shown hatched on the right-hand side of the illustration in FIG. 3. These containers serve to implement mechanisms for maintenance of meta information and the mechanisms for granting access to this meta information. The containers represent an encapsulating layer around the object, and all access to an object can take place only by way of the interface OI. The interface OI gives access to the methods and data and to the meta information of the object. When accessing the data, the methods or the meta information, a user can thus abstract from the implementation of data methods and meta information. All accesses to an object are made by way of the interface OI. As a result, it is very easily possible to achieve reusability and exchangeability of objects. In a system which is also complex, such as a software system, it is thus possible to always access objects in the same manner. In particular, the so-called containers make available infrastructure functions such as data networking, data storage and data visualization in a uniform manner for all types of objects (for example business objects, installation objects). A double helix comparable with a DNA structure in a human cell is represented schematically in the container. This is intended to show clearly that an object contains parts of or the entire meta information, in other words including the structure information and the logic which for example goes into a business process. As a result, the entire system or the entire application can be organized or can be reorganized from one object. As a result, downtimes for a system can be minimized and maintenance operations can be performed very efficiently.

Through the use of markup languages, meta information can be very skillfully and simply be coupled to, or incorporated in, objects and also systems. XML (Extended Markup Language) in particular offers capabilities for the simple formulation of meta information and coupling this to objects. Meta information can be deposited in XML for example as elements (enclosed between a start tag and an end tag) or as attributes (integrated directly into a start tag).

The infrastructure functions made available by a container include for example trace functions, in other words who has used an object and for how long. As mentioned previously, the container contains meta information, self-description information for the object. By this means it is also possible to insert measurements, and even security mechanisms.

Figure 4:
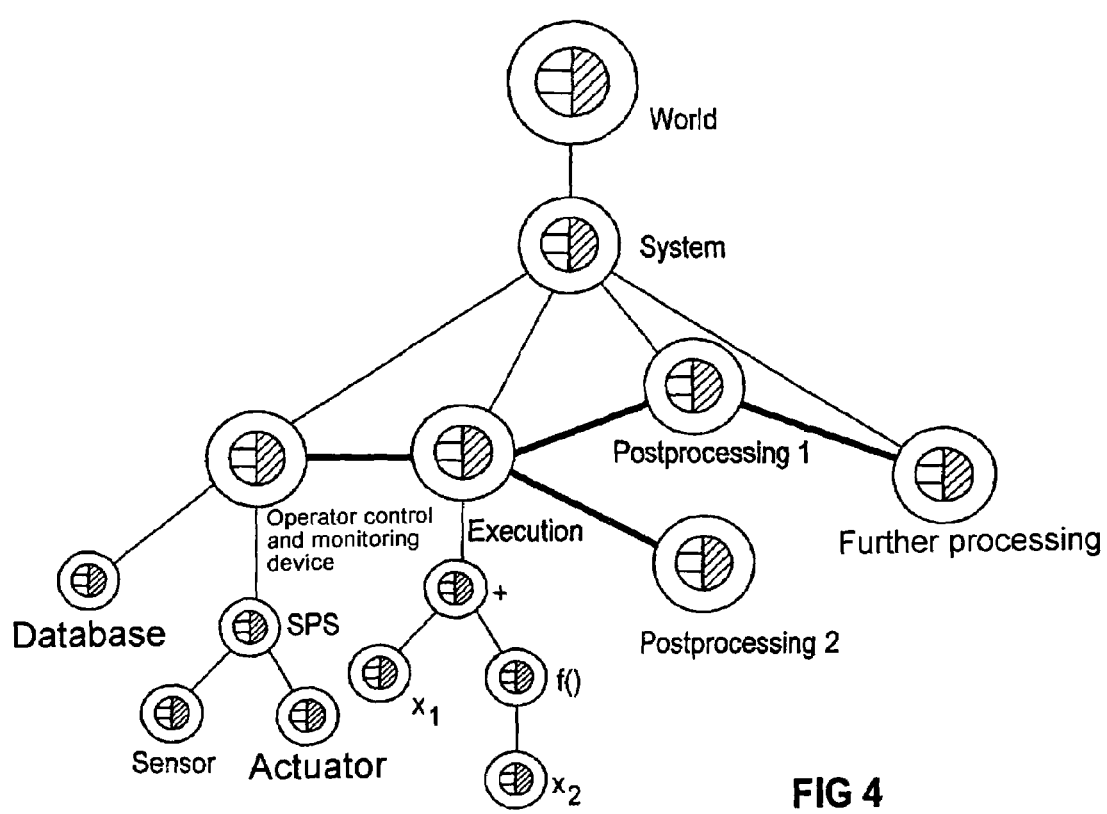
FIG. 4 shows the tree structure of an installation created in the engineering phase.

The illustration in FIG. 4 shows the tree structure of an installation structure or the structure for an automation solution. In this situation, the objects are represented as double circles. The inner circle represents the make-up of an object schematically, as it is known from FIG. 3. In this case, the left-hand part of an object again represents the data methods and sub-objects, the right-hand hatched part represents the so-called container which contains the meta information and makes available the infrastructure information for an object. The container represents an encapsulating layer for the object. Access to the object can take place only by way of the object interface OI which is made available by the container.

Infrastructure functions are data networking, data storage and data visualization, for example. These functions are made available by the container in a uniform manner for all other objects.

The outer circles around the objects represent the fact that the objects are in the last analysis embedded into the infrastructure of a system. One aspect of the infrastructure is the networking. Networking or cross-referencing by means of pointers can be implemented with a very fine level of granularity, for example using memory pointers. However, this can also be implemented by way of the internet, email or telephone connections.

In the illustration in FIG. 4, the connecting lines drawn in between the objects in bold serve to represent the fact that these objects are connected to one another laterally. In an industrial environment, such a lateral connection can be a connection implemented by way of OPC (OLE for Process Control). Such a connection or an infrastructure service can also be implemented by way of message queue mechanisms. Access to infrastructure services or functionalities is offered by way of the container and is the same for all objects in a tree, regardless of whether it is a question of an operator control and monitoring device or a programmable controller (SPS). It is therefore also extremely simple to modify the implementation of an infrastructure service since the specification remains unchanged. The outer circle of an object thus represents a collection of infrastructure services or infrastructure functions which can be used by way of a container. Once an infrastructure service has been implemented, it can be used in the same manner by all objects.

The illustration in FIG. 4 shows an installation structure in which the objects are structured as a hierarchical tree. The installation or control task to be implemented contains an operator control and monitoring device with a database DB, whereby the operator control and monitoring device is supported by a programmable controller (SPS). The SPS accesses actuators and sensors by way of input/output functions. The results from the operator control and monitoring device are further processed by an "Execution" object. The algorithm, implemented in the "Execution" object for this further processing, is represented by the sub-tree which lies beneath the "Execution" object. In this situation, a value X1 is processed using a function F, whereby the function F receives the value X2 as its input value. After this Execution component has executed, further postprocessing operations are carried out, represented by the objects "Postprocessing 1" and "Postprocessing 2". In this situation, these may be concerned with compression or display functions, for example. FIG. 4 shows that the results from the postprocessing carried out by "Postprocessing 1" are subjected to a further processing step by the "Further processing" object. An installation described in this manner can of course with other installations described in this manner be part of a superordinate world, represented here in FIG. 4 by the "World" object.

In addition to the hierarchical structuring, as it is specified by the structure of the tree, the objects can also be interconnected by lateral or horizontal networking, reflexed or cross-referencing by means of pointers. This is represented in FIG. 4 by the bold lines. Such cross-referencing by means of pointers can be modeled by way of input masks or can also produced by way of drag & drop mechanisms.

The function which is implemented by an installation or control facility results from the structure, from the hierarchy and from the networked connections of the tree objects. The tree elements, in other words the objects, are processed and executed depending on a traversing algorithm which is to be taken as a basis. The execution of an application for an installation or a control facility is comparable with the mode of functioning of the nervous system of a human being where the individual neurons are interconnected by way of dendrites and synapses and exchange their activities with one another, whereby a stimulus triggers a chain of impulses through the body and such a chain of impulses is executed as a function of the networked connections of the neurons. In the engineering system according to the invention, a chain of events is also triggered by the structure and the networking of the objects, which are comparable with the neurons in the human body, as by a stimulus as shown in FIG. 4, e.g. when a sensor forwards an event to an SPS and this event is registered via the operator control and monitoring device and then an execution is started which in turn triggers "Postprocessing 1" and "Postprocessing 2" to perform a further processing operation, whereby after the further processing "Postprocessing 1" initiates another further processing operation. Installations or control facilities created in this manner have extremely advantageous characteristics. The objects which are required for an application can thus only be brought together at runtime, as a result of which the modification capability and the flexibility of these applications is particularly great. In the case of modifications, there is no need to first compile an object. An object newly incorporated into the system which replaces another object can be integrated extremely easily if it has the same interface, the same specification as the object to be replaced and changes only in the implementation, for example through an improved performance.

Figure 5:
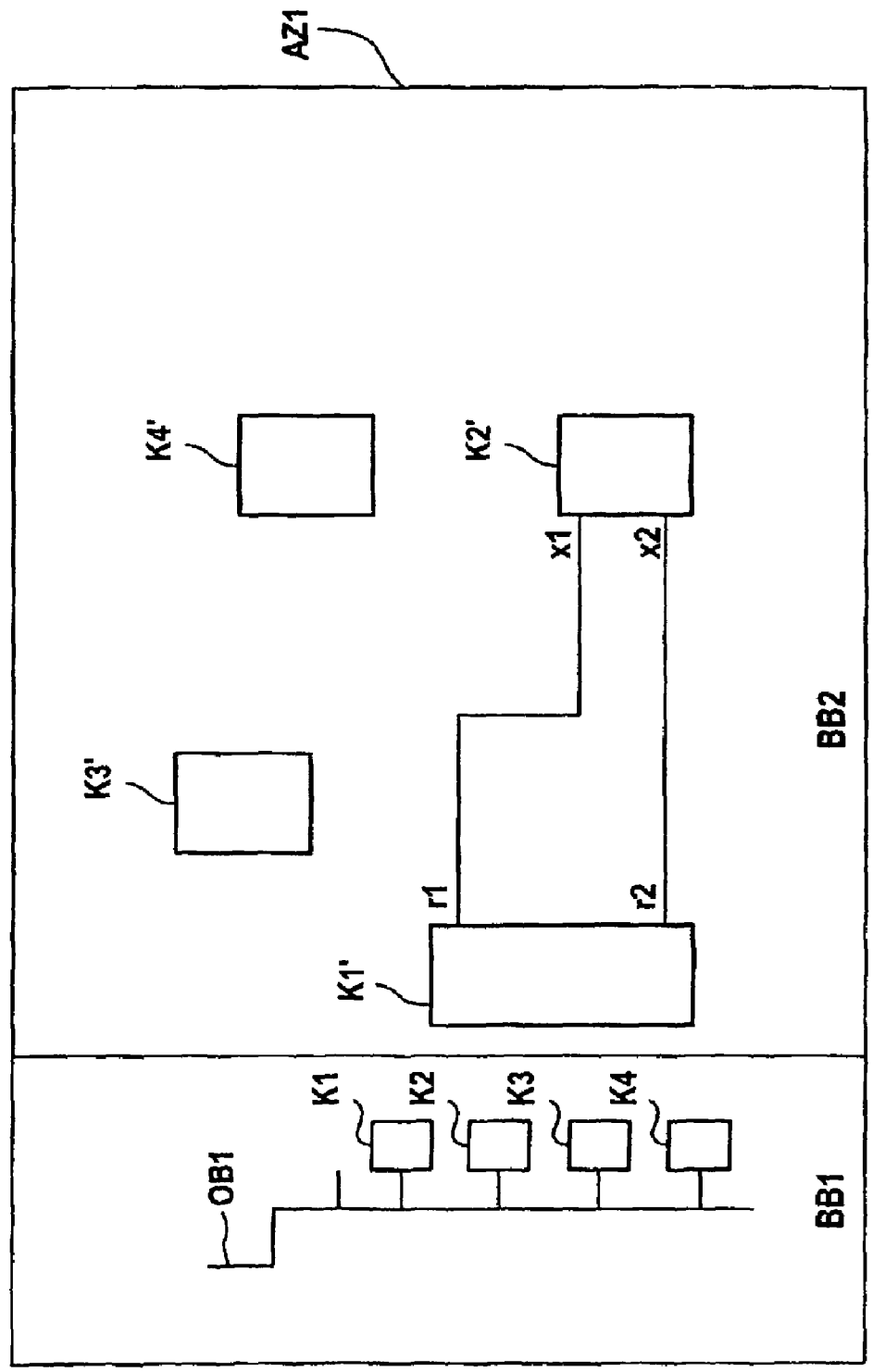
FIG. 5 shows one form of representation for a tree.

The illustration in FIG. 5 shows a form of representation for a tree. The tree represents an installation or a part of an installation or a solution which is to be implemented using the components of the installation. In FIG. 5, a display device AZ1 is represented as having the two screen areas BB1 and BB2. A display device AZ1 can, for example, be a monitor or a display. The display device AZ1 is normally an element of an engineering system (ES; FIG. 2). With the aid of display devices and input auxiliary devices such as keyboard or mouse, for example, objects are generated on the screen, hierarchically structured as a tree, interconnected by networking or by cross-referencing by means of pointers, but provided with meta information or other information. It is conceivable that a display device AZ1 may contain further screen areas for the representation of trees, but also in order to implement inputs (menu bars for example). A concrete solution for a task to be implemented using the modeled objects is put together at runtime from the objects in the tree. The structure is important for the processing of the objects, as is also the networking of the objects. If a user (a system integrator or maintenance engineer, for example) wishes to introduce changes, then he will need a representation of the tree which meets his corresponding requirements. In the representation as it appears in the screen area BB1 on the left-hand side of FIG. 5, a tree OB1 is shown with the tree elements K1, K2, K3, K4, and it is shown in an Explorer-like notation. The representation of a tree, as it is shown in the screen area BB2, corresponds to a notation such as is used for circuit diagrams, for example. The elements K1' and K2' represented in the screen area BB2 are represented as a tree structure by way of input variables (x1, x2) and output variables (r1, r2) which are connected to one another by means of respective lines. A representation in this form of schematic circuit diagrams is of particular interest to electricians because electricians think in terms of circuit diagrams. By using input auxiliary devices it is possible to modify the representation of a tree and to select the most practical representation in each case for the user group. User groups are for example maintenance engineers, system integrators, developers, and also sales and marketing personnel.

Figure 6:
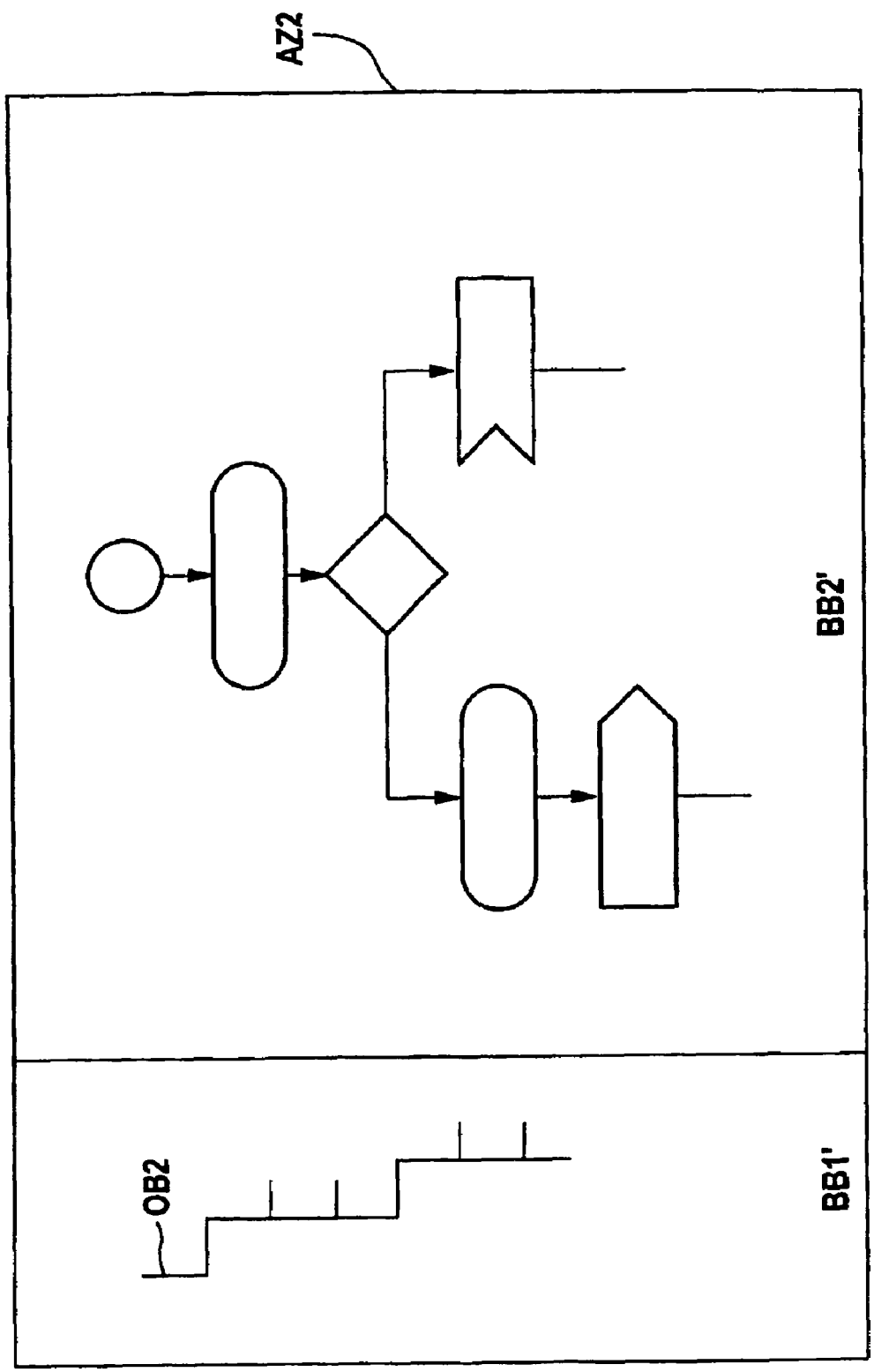
FIG. 6 shows a further form of representation for a tree.

The illustration in FIG. 6 shows a further possible way in which a tree (containing the installation components created in the engineering phase) can be represented on a display device AZ2 of an engineering system (ES; FIG. 2). The left-hand section of FIG. 6 shows a screen area BB1' with an object tree OB2 in an Explorer-like structure. The right-hand part of FIG. 6 shows a screen area BB2' in which a notation that is particularly advantageous for the representation of business processes is used in order to represent a tree. Personnel in the accounts department or in the management of the company think in terms of such business process sequences. The user friendliness and also the efficiency when creating trees or when modifying trees is greatly increased by the capability offered for switching between different forms of representation. A user can thereby abstract from the internal representation or implementation of a tree. When creating a tree or when modifying a tree no new programming is required, but everything can be configured for the specific project. This is advantageous for efficiency with regard to the creation of applications, for example for the solution of MES tasks (order handling etc.) or for the solution of automation tasks.

Figure 7:
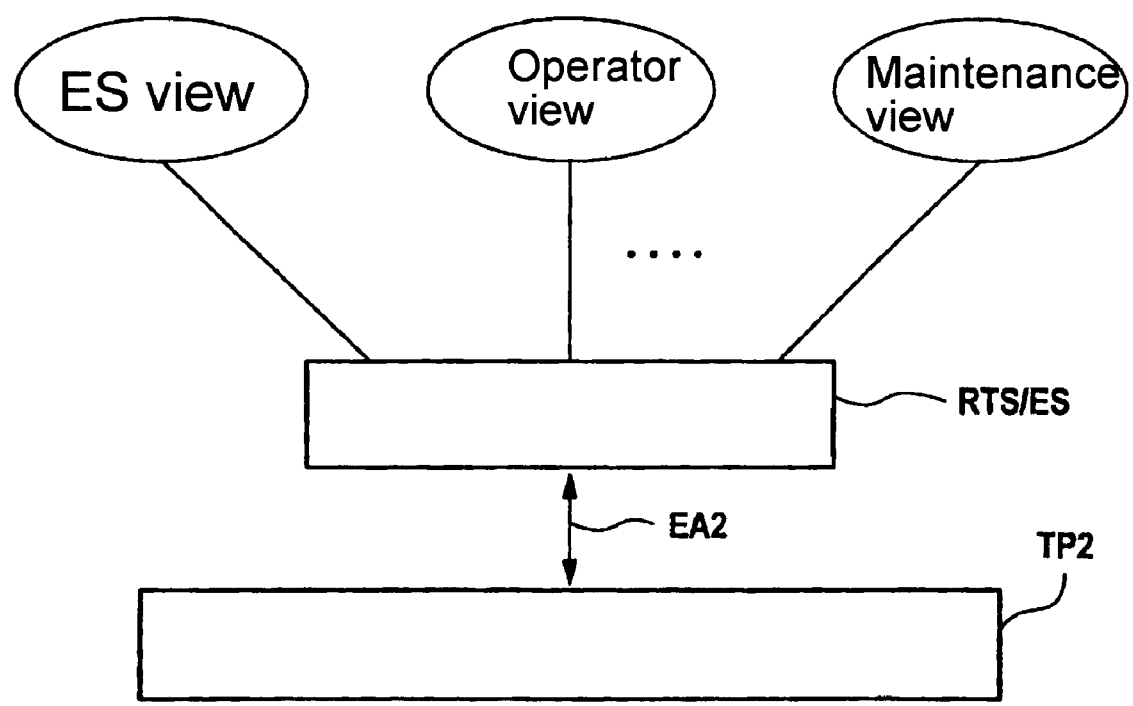
FIG. 7 shows a schematic representation comprising a runtime system and a technical process to be controlled, whereby functions of the engineering system are integrated into the runtime system.

The illustration in FIG. 7 shows a schematic representation with an extended runtime system RTS/ES and a technical process to be controlled TP2, whereby functions of the engineering system are integrated into the extended runtime system RTS/ES. Access to the functions required in each case is effected by way of so-called views. In FIG. 7, views are represented for engineering (ES view), for operation (operator view) and for maintenance (maintenance view). The ellipsis indicates that further views may be present. The extended runtime system RTS/ES contains the infrastructure for the development and modification of the runtime system. The connection with the technical process to be controlled TP2 is effected by way of input/output connections EA2.

It is an important effect of the invention that the functionality of a conventional engineering system (ES; FIG. 2,) is covered in major areas by the runtime system RTS/ES. Meta data is for the most part data that occurs in any case during development. Runtime system and engineering system can thus fuse together, so to speak, and no longer need to take the form of separate components. At runtime, a system which is capable of modification contains many aspects which today are only present in development environments (modeling, versioning, compilation etc). The traditional engineering system is reduced to representations and editors which allow the runtime system to be directly observed and changed.

The advantages of this design principle and this architecture include system consistency in addition to the simple capability for modifying the runtime system. All components that contain or reference the meta data are self-describing.

The combination of the components yields an overall system description. In other words, regardless of how the system is modified (modules inserted or removed, for example), the views (engineering views) have the capability to always show the currently available system. UML diagrams, business process illustrations, circuit diagrams, installation displays are always current.

To summarize, the invention relates to an engineering method and an engineering system for industrial automation systems, in particular for MES systems, based on at least one computational unit with an input auxiliary device, an output auxiliary device, and also at least one display device, whereby the modeled objects comprise installation structures or installation parts and are linked with meta information. The modeled objects are structured in the engineering phase as hierarchical trees and can also be interconnected by lateral networking or cross-referenced by means of pointers. At runtime, the meta information is utilized to bring the objects to execution on a target system, whereby the functionality of an installation modeled in the engineering phase is determined from the structure of the tree and the networked connections.

The method and engineering system, described above, according to the invention can be implemented as a computer program in languages known for the purpose. A computer program implemented in such a way can in a likewise known manner be stored and transported by way of electronic data paths.

The invention claimed is:

1. An engineering system for creating and editing programs that control and regulate processes in automation systems, comprising:
    a computational unit;
    an input device;
    a display device;
    a mechanism for object oriented modelling of the processes, including creating objects which represent partial functions of an automation solution, the objects being executable in a runtime system;
    a mechanism for hierarchically structuring and networking the objects as hierarchical trees in a first screen area of the display device;
    a mechanism for assigning meta information to the objects, the meta information including information relating both to the objects and an associated process being modelled such that a program function relating to control and regulation of a process in an automation system can be derived from the meta information, the structuring and the networking of the objects; and
    a mechanism for networking the objects in a second screen area of the display device, wherein networking mechanisms are used, the combination of mechanisms enabling creation and editing of programs that control and regulate processes,
    wherein the meta information is also assigned to the objects in the runtime system, and wherein the engineering system is designed to exchange objects in the runtime system at runtime while evaluating the meta information.

2. The system of claim 1 wherein the engineering system models an installation and the meta information includes information relating to the installation.

3. The system of claim 1 wherein the objects physically contain the meta information assigned thereto.

4. The system of claim 1 wherein the objects are linked to the meta information by way of referencing.

5. The system of claim 1 wherein all meta information relating to a process is assigned to the objects.

6. The system of claim 1 wherein the engineering system is integrated into the runtime system.

7. The system of claim 1 wherein an incremental compiler or interpreter is active locally to objects only during times of exchange and which generates code incrementally for the objects to be newly inserted in the runtime system at runtime while evaluating the meta information.

* * * * *

UNITED STATES PATENT AND TRADEMARK OFFICE
CERTIFICATE OF CORRECTION

PATENT NO. : 7,657,404 B2  Page 1 of 1
APPLICATION NO. : 10/504937
DATED : February 2, 2010
INVENTOR(S) : Elmar Thurner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Thirtieth Day of November, 2010

David J. Kappos
*Director of the United States Patent and Trademark Office*